US012729967B2

(12) United States Patent
Xu et al.

(10) Patent No.: US 12,729,967 B2
(45) Date of Patent: Sep. 8, 2026

(54) VEHICLE NAVIGATION METHOD BASED ON IMPROVED A-star ALGORITHM

(71) Applicant: ZHEJIANG UNIVERSITY OF SCIENCE & TECHNOLOGY, Hangzhou City (CN)

(72) Inventors: Xing Xu, Hangzhou City (CN); Yun Zhao, Hangzhou City (CN); Yu Xie, Hangzhou City (CN)

(73) Assignee: ZHEJIANG UNIVERSITY OF SCIENCE & TECHNOLOGY, Hangzhou City (CN)

( * ) Notice: Subject to any disclaimer, the term of this patent is extended or adjusted under 35 U.S.C. 154(b) by 96 days.

(21) Appl. No.: 18/770,972

(22) Filed: Jul. 12, 2024

(65) Prior Publication Data

US 2025/0020476 A1 Jan. 16, 2025

(30) Foreign Application Priority Data

Jul. 12, 2023 (CN) ......................... 202310852637.2

(51) Int. Cl.
*G01C 21/34* (2006.01)

(52) U.S. Cl.
CPC ................................ *G01C 21/3446* (2013.01)

(58) Field of Classification Search
CPC .... G01C 21/3446; G01C 21/20; G01C 21/30; G01C 21/343; Y02T 10/40
See application file for complete search history.

(56) References Cited

U.S. PATENT DOCUMENTS

2013/0345954 A1* 12/2013 Tashiro .................... G08G 1/00 701/117
2019/0293441 A1* 9/2019 Melnikov .......... G01C 21/3461
2021/0341309 A1* 11/2021 Yuan ................ G08G 1/096883
2022/0113150 A1* 4/2022 Hidayat ............ G01C 21/3446

OTHER PUBLICATIONS

Junfeng Yao, Chao Lin, Xiaobiao Xie, Andy Juan Wang, Chih-Cheng Hung, Path Planning for Virtual Human Motion Using Improved A* Algorithm, 2010 (Year: 2010).*
Yao, Path Planning for Virtual Human Motion Using Improved A* Algorithm (Year: 2010).*

* cited by examiner

*Primary Examiner* — Khoi H Tran
*Assistant Examiner* — Tristan J Greiner
(74) *Attorney, Agent, or Firm* — Suiter wantz IP

(57) ABSTRACT

Provided is a vehicle navigation method based on an improved A-star (A*) algorithm, relating to the technical field of path panning. The method includes: converting a regional map for path planning into a grid map; planning a target travel path of an automated guided vehicle from a starting point to a target point on the grid map by using an improved A* algorithm, where the improved A* algorithm is an A* algorithm incorporating turning costs into a cost function; and navigating the automated guided vehicle along the target travel path. The method reduces the turning costs and improves navigation efficiency.

5 Claims, 19 Drawing Sheets

Convert a regional map for path planning into a grid map — 101

Plan a target travel path of an AGV from a starting point to a target point on the grid map by using an improved A* algorithm, where the improved A* algorithm is an A* algorithm incorporating turning costs into a cost function — 102

Navigate the AGV along the target travel path — 103

VEHICLE NAVIGATION METHOD BASED ON IMPROVED A-star ALGORITHM

CROSS REFERENCE TO RELATED APPLICATION

This patent application claims the benefit and priority of Chinese Patent Application No. 202310852637.2, filed with the China National Intellectual Property Administration on Jul. 12, 2023, the disclosure of which is incorporated by reference herein in its entirety as part of the present application.

TECHNICAL FIELD

The present disclosure relates to the technical field of path planning, and in particular, to a vehicle navigation method based on an improved A-star (A*) algorithm.

BACKGROUND

Automated Guided Vehicle (AGV) refers to a transport vehicle equipped with automatic guidance devices such as electromagnetic or optical systems. These transport vehicles can travel along predefined paths with safety features and various material transfer functions. The control of AGV systems is achieved through the collaboration of a logistics upper-level scheduling system, an AGV ground control system, and an AGV onboard control system.

When navigating and controlling AGV vehicles, traditional A* algorithm for path planning exhibits two prominent drawbacks:

1. The paths generated by the traditional A* algorithm tend to have numerous turning points. Excessive turning points can negatively impact the operation of AGVs in reality, as more turns lead to increased time consumption.
2. The traditional A* algorithm expands too many nodes during path search, resulting in computational time and resource wastage.

SUMMARY

An objective of the present disclosure is to provide a vehicle navigation method based on an improved A* algorithm to reduce turning costs and enhance navigation efficiency.

To achieve the above objective, the present disclosure provides the following technical solution:

A vehicle navigation method based on an improved A* algorithm is provided, including:

converting a regional map for path planning into a grid map;

planning a target travel path of an AGV from a starting point to a target point on the grid map by using an improved A* algorithm, where the improved A* algorithm is an A* algorithm incorporating turning costs into a cost function; and navigating the AGV along the target travel path.

Optionally, said planning the target travel path of the AGV from the starting point to the target point on the grid map by using the improved A* algorithm specifically includes:

initializing a parent node for the starting point and adding the parent node of the starting point to an Open set;

removing a node with a minimum cost function value from the Open set to a Close set, and using the node with the minimum cost function value as a current node;

expanding neighboring nodes for the current node;

traversing the neighboring nodes expanded from the current node, and if a currently traversed neighboring node is not in the Close set, determining whether the current node is a turning node based on the current node, a parent node of the current node, and the currently traversed neighboring node;

if the current node is a turning node, recalculating a cost function value from the current node to the currently traversed neighboring node using the cost function that includes the turning costs, where the recalculated cost function value includes a movement cost and an estimated cost;

if the movement cost after the recalculation is less than the movement cost before the recalculation, updating the cost function value of the current node to the recalculated cost function value, updating the current node to a parent node of the currently traversed neighboring node, and adding the currently traversed neighboring node to the Open set; and repeating the step of "removing a node with a minimum cost function value from the Open set to a Close set, and using the node with the minimum cost function value as a current node", until the neighboring nodes expanded from the current node include the target point, and concluding the improved A* algorithm.

Optionally, the cost function that includes the turning costs is represented as follows:

$$f(n) = g(n) + h(n);$$

$$g(n) = \text{step\_cost}(n) + \text{turn\_cost}(n);$$

where f(n) is a cost function value of node n, g(n) is a movement cost of node n, h(n) is an estimated cost of node n to an endpoint, step_cost(n) is a linear movement cost of node n, and turn_cost(n) is a turning cost of node n.

Optionally, said determining whether the current node is a turning node based on the current node, the parent node of the current node, and the currently traversed neighboring node includes:

if an abscissa of the parent node of the current node is the same as an abscissa of the current node, and the abscissa of the current node is different from an abscissa of the currently traversed neighboring node, determining that the current node is a turning node; and if an ordinate of the parent node of the current node is the same as an ordinate of the current node, and the ordinate of the current node is different from an ordinate of the currently traversed neighboring node, determining that the current node is a turning node.

Optionally, the turning cost is set to 0.01.

Optionally, the cost function in the improved A* algorithm is further represented as follows:

$$f(n) = g(n) + w * h(n);$$

where $f(n)$ is a cost function value of node n, g(n) is a movement cost of node n, h(n) is an estimated cost of node n to an endpoint, and w is a dynamic parameter.

Optionally, if a distance between node n and the target point is greater than a set distance, w=1.5; otherwise, w=0.95.

According to specific embodiments provided in the present disclosure, the present disclosure has the following technical effects:

The improved A* algorithm in the present disclosure incorporates turning costs into the cost function when calculating movement costs, which reduces the number of turning points in path planning and reduces the turning frequency of AGV vehicles, thereby decreasing turning costs and enhancing navigation efficiency.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can still be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a vehicle navigation method based on an improved A* algorithm to reduce turning costs and enhance navigation efficiency.

In order to make the above objective, features and advantages of the present disclosure clearer and more comprehensible, the present disclosure will be further described in detail below in combination with accompanying drawings and particular implementations.

Figure 1:
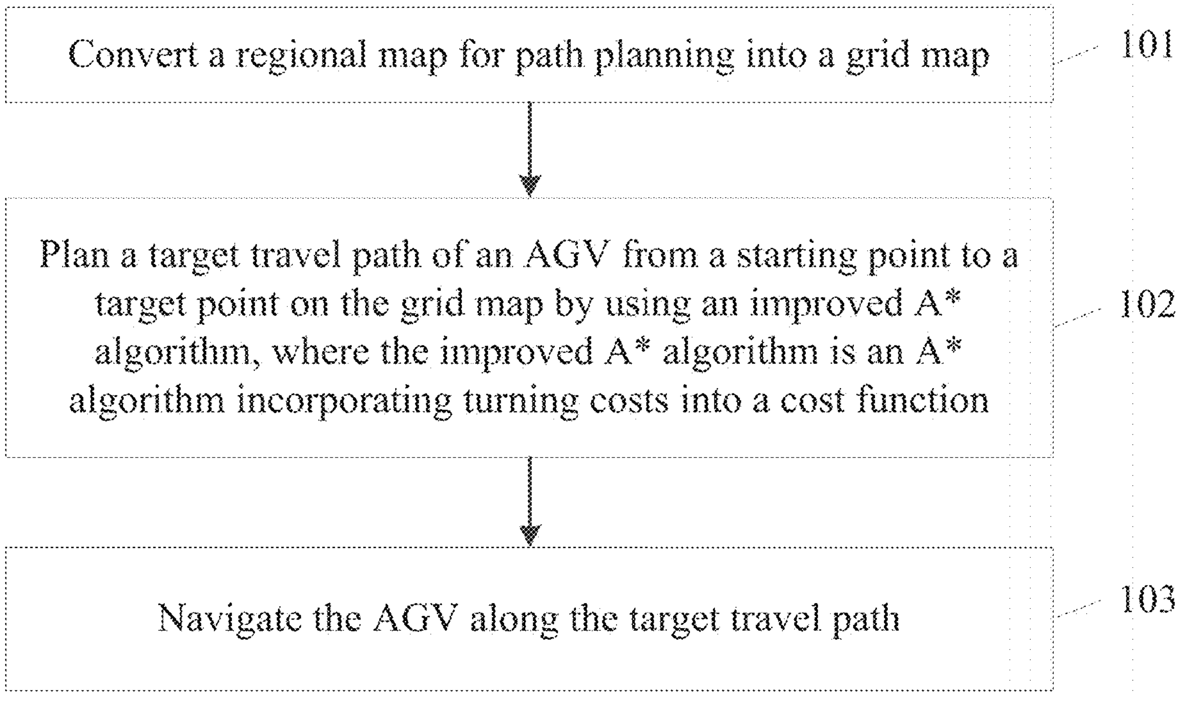
FIG. 1 illustrates a vehicle navigation method based on an improved A* algorithm according to an embodiment of the present disclosure.

As shown in FIG. 1, the present disclosure provides a vehicle navigation method based on an improved A* algorithm. The method specifically includes the following steps:

Step 101: Convert a regional map for path planning into a grid map.

Step 102: Plan a target travel path of an AGV from a starting point to a target point on the grid map by using an improved A* algorithm, where the improved A* algorithm is an A* algorithm incorporating turning costs into a cost function.

Step 103: Navigate the AGV along the target travel path.

The traditional A-star (A*) algorithm works as follows:

The A* algorithm combines an actual distance from a starting point and an estimated distance to a target point as a cost function. This significantly improves upon the drawbacks of the Dijkstra algorithm, which tends to explore many unnecessary nodes before reaching the target point and thus wastes time, and the shortcomings of greedy algorithms that often fail to find the optimal path. The A* algorithm prioritizes paths that are potentially closer to the target, making it an adaptive and flexible heuristic pathfinding algorithm commonly used in global path planning for mobile robots.

The A* algorithm evaluates expanded nodes based on a heuristic function combined with the cost function. The cost function is represented as follows:

$$f(n)=g(n)+h(n).$$

The process of the A* algorithm is similar to that of the Dijkstra algorithm. The difference lies in introducing the cost function $f(n)$ during the iteration process and selecting a node with a minimum cost value based on the cost function. The A* algorithm typically utilizes two lists: a Close list and an Open list, which conceptually map to the S set and U set introduced in the Dijkstra algorithm. The Close list is used to store already expanded current nodes and obstacle nodes to prevent subsequent expansion into these nodes, while the Open list is used to store nodes awaiting expansion. In the A* algorithm, lists or sets named Close and Open are commonly created.

$f(n)$ represents a comprehensive priority of node n. When selecting a next node to be traversed, the algorithm always selects a node with a highest comprehensive priority (i.e., a smallest value).

g(n) denotes a cost of node n from the starting point.

h(n) represents an estimated cost of node n from the endpoint, and serves as the heuristic function in the A* algorithm.

Figure 2:
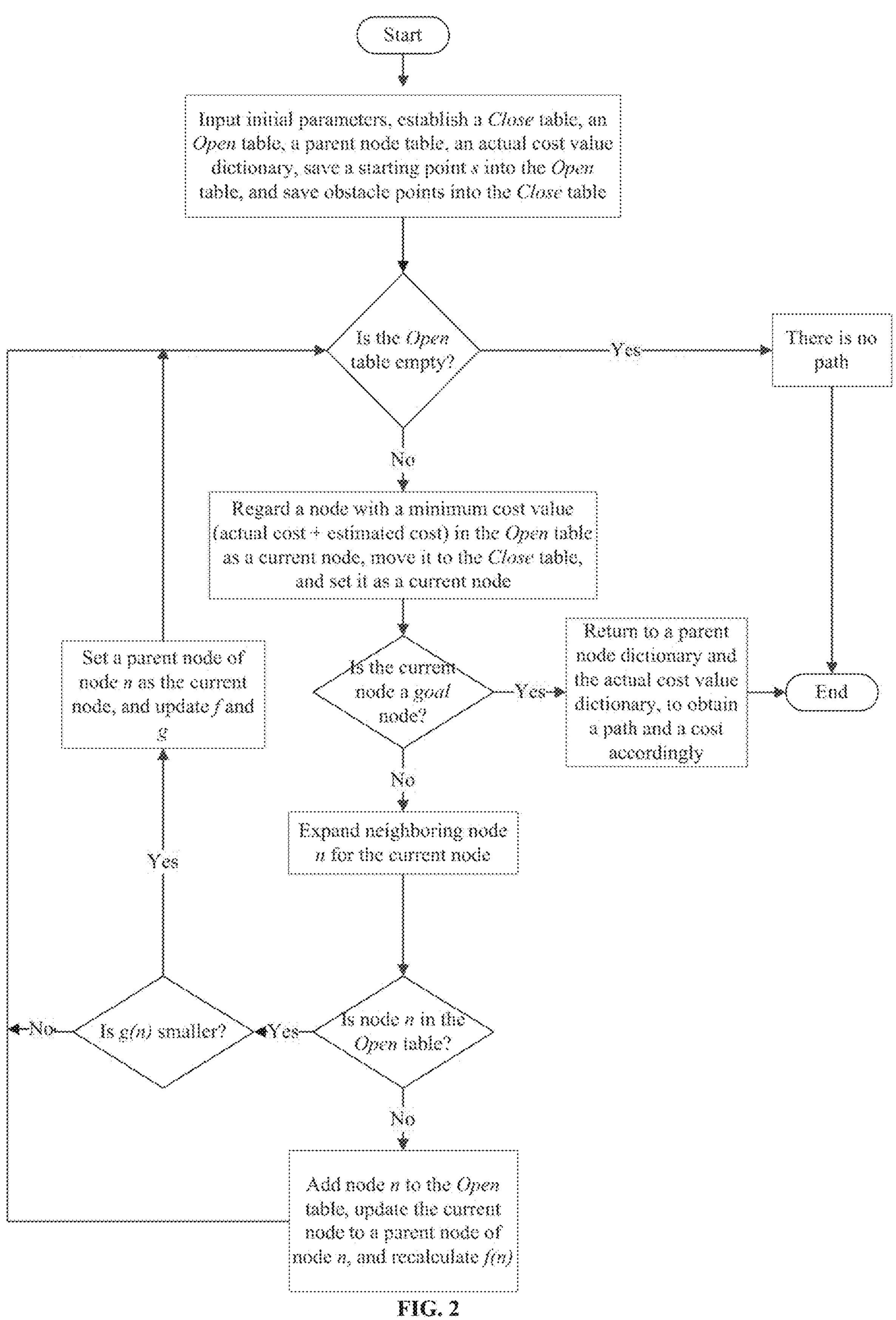
FIG. 2 is a flowchart of an A* algorithm according to an embodiment of the present disclosure.

As shown in FIG. 2, path searching of the A* algorithm includes the following steps:

1. Add the starting point to the Open list.
2. Repeat the following process:

a. Traverse the Open list to find a node with a minimum $f(n)$ value, and set the found node as a current node.

b. Move the found node to the Close list.

c. Traverse adjacent squares of a current square:

if the adjacent square is unreachable or in the Close list, skipping the adjacent square;

if the adjacent square is not in the Open list, adding the adjacent square to the Open list, setting the current square as a parent node of the adjacent square, and recording $f(n)$, g(n), and h(n) values of the adjacent square; and if the adjacent square is already in the Open list, checking whether the cost g(n) to reach the adjacent square via the current square is smaller; if the cost is smaller, which indicates a shorter and better path, setting the current square as a parent node of the adjacent square, and recalculating g(n) and $f(n)$ values of the adjacent square, i.e., updating information of the adjacent square.

d. Stop the algorithm when the endpoint is added to the Open list or the Open list is empty.

3. Save the path. Starting from the endpoint, the path is obtained by moving through each square along their parent nodes until reaching the starting point.

In FIG. 2, table O represents the Open, and table C represents the Close list.

Figure 4:
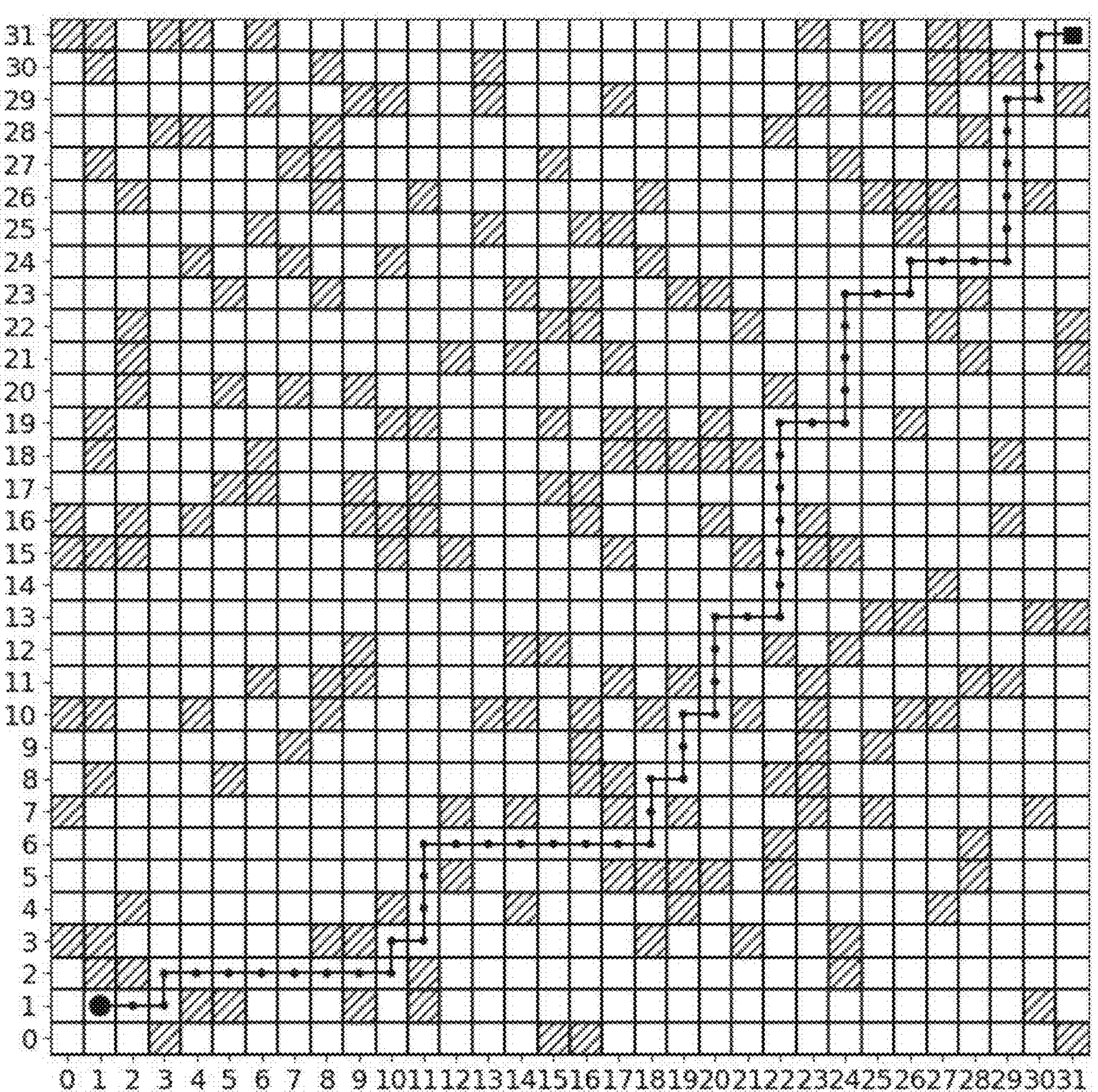
FIG. 4 is a first schematic diagram of a path generated using a traditional A* algorithm according to an embodiment of the present disclosure.

In the context of a Windows 10 operating system and a Python 3.8 programming environment, simulation experiments were designed, where the original A* algorithm was used to solve path planning problems for AGVs, and output data was visualized using a Plot library. A map environment for simulation was designed as a 32*32 grid map with randomly generated obstacles. Simulation results of path planning are depicted in FIG. 4, where black squares represent obstacle areas that the robot cannot traverse; white squares represent passable obstacle-free areas, and the AGV can move only in the passable areas; the line from the starting point to the target point represents the planned path. The circle in FIG. 4 represents the starting point.

In FIG. 4, the circle at the bottom left corner with coordinates (1, 1) represents the AGV, while the square at the top right corner with coordinates (31, 31) represents the target point of the AGV. The line from the starting point to the target point depicts the planned path. The runtime for the path planning part of the code was 0.5026683 seconds, with 22 turning points, a traversal cost of 61, and 432 expanded nodes.

Through simulation results, it can be concluded that the original A* algorithm applied to the path planning can quickly bypass obstacles and successfully reach the final target point. However, two shortcomings are identified from the displayed generated path and the number of expanded nodes in the search:

1. When the traditional A* algorithm is applied to path planning for AGVs, the obtained path cannot be considered optimal. This is because the planned path contains too many turning points and lacks smoothness. In reality, if a robot moves along this zigzag path, it will result in frequent turns, leading to excessive motion loss.
2. There is an excessive number of nodes expanded during the search. The displayed expanded nodes show that too many useless nodes are searched during the search process, ultimately leading to a decrease in search efficiency.

Figure 5:
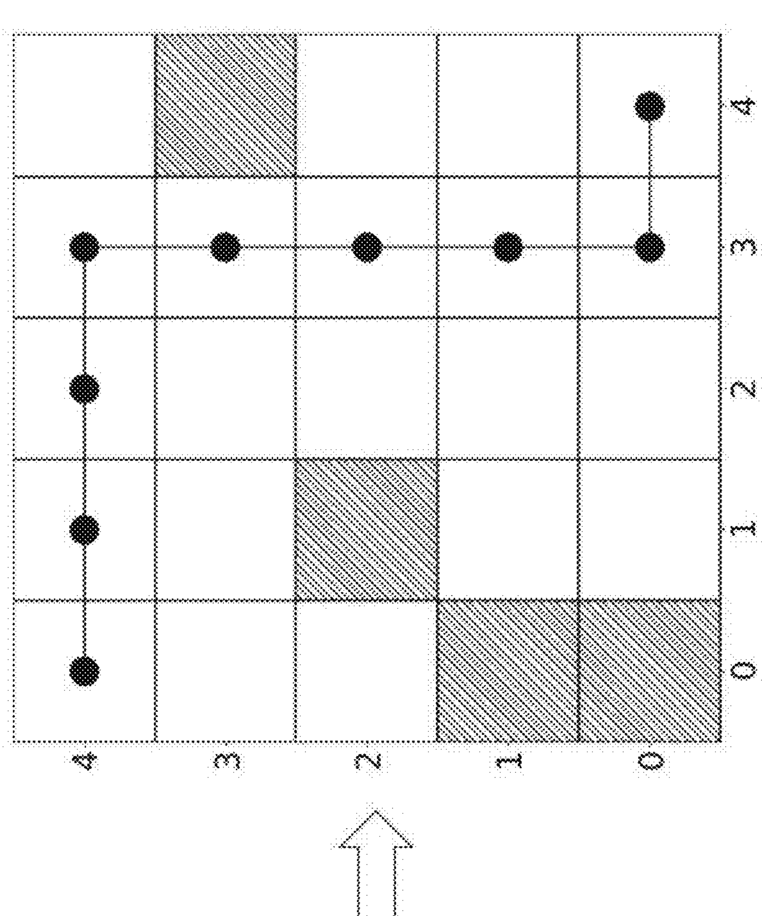
FIG. 5 illustrates the problem of excessive turning points in the path generated using the traditional A* algorithm and a desired effect of reduced turning points according to an embodiment of the present disclosure.
Figure 5:
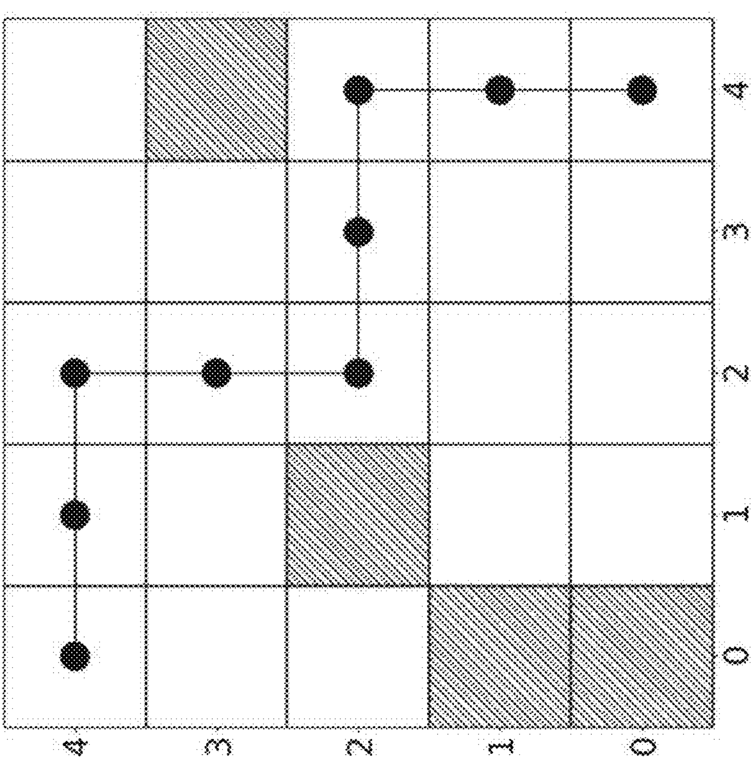

In order to obtain a cost function that better reflects the actual operational cost of AGVs and make the path smoother, a method for determining whether a turning point occurs based on coordinate points is proposed. The actual cost function g(n) will be composed of an actual movement distance step_cost(n) and a turning cost function turn_cost (n) step_cost(n) represents the actual movement cost, where the cost of one movement is denoted as 1*step_cost; turn_cost(n) represents the turning cost, where the turning cost turn_cost is incurred each time a turn is made. In FIG. 5, the actual cost function g(n) for path planning using the A* algorithm is represented as follows:

$$g(n)=\text{step\_cos}\,t(n).$$

The actual cost function g(n) for path planning using the improved A* algorithm is represented as follows:

$$g(n)=\text{step\_cost}(n)+\text{turn\_cost}(n)$$

By comparing the actual cost functions before and after the improvement, it can be predicted that the A* algorithm, when expanding search nodes, will select a path with fewer turning points based on the path cost under the influence of the turning cost function. As shown in FIG. 5(*a*), the path cost in the original A* algorithm is 8 movements plus 3 turns, while as shown in FIG. 5(*b*), the path cost in the improved A* algorithm is 8 movements plus 2 turns, which is lower.

To differentiate designs of the cost g(n) in different movement states, it is necessary to determine whether a turning point occurs in the planned path and adjust the cost function accordingly.

Figure 6:
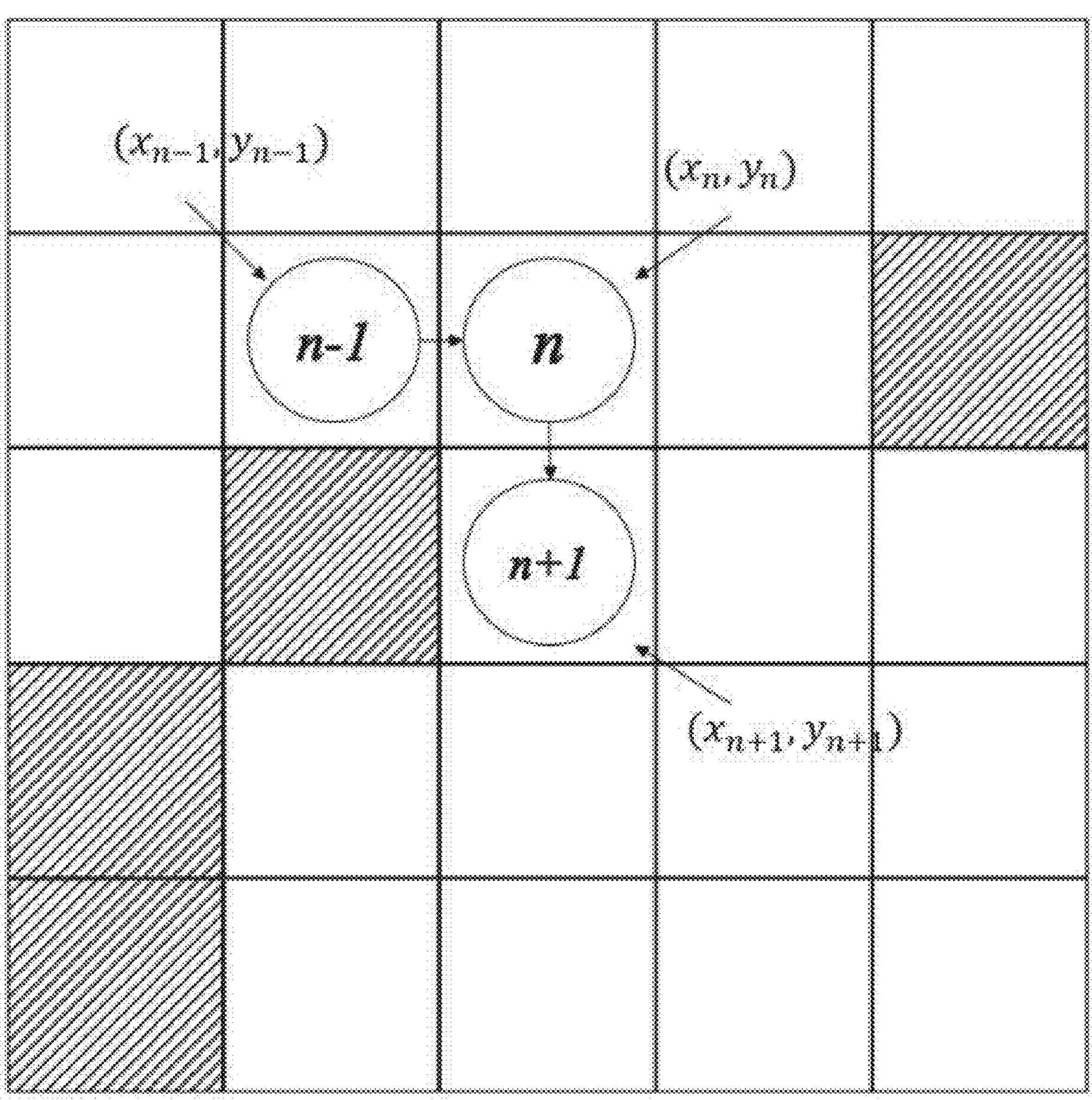
FIG. 6 is a schematic diagram of a positional relationship among node n, node n−1, and node n+1 according to an embodiment of the present disclosure.

Spatiotemporal information of AGV movement is represented in a grid map, where the coordinate point of the AGV at time n is denoted as $(x_n, y_n)$; the coordinate point of the AGV at time n−1, i.e., the previous coordinate point of the AGV, is denoted as $(x_{n-1}, y_{n-1})$; the coordinate point at next time n+1 is denoted as $(x_{n+1}, y_{n+1})$. The three coordinate points are continuous, as shown in FIG. 6.

Based on the positional relationship information of the first two points of the three continuous points, it can be determined whether the third point is a point after a turn. Since point $(x_n, y_n)$ and point $(x_{n-1}, y_{n-1})$ are continuous and adjacent, either their horizontal coordinates or their vertical coordinates are equal, that is:

$$x_{n-1} == x_n.$$

or $$y_{n-1} == y_n$$

If $x_{n-1}==x_n$, it indicates that the AGV is moving vertically. In this case, it is only necessary to verify whether $x_{n+1}$ is equal to $x_n$. If yes, it means that the AGV has not changed the direction and is still moving along the vertical line. In this case, the movement cost is g=1*step_cost, without incurring a turning penalty cost. If $x_{n+1}$ is not equal to $x_n$, it indicates that at time n+1, the position of the AGV is reached after a turn, and the cost of this step becomes ƒ=1*step_cost+1*turn_cost.

The analysis above determines whether the third point is a point reached after a turn based on the coordinate values of the previous two positions of the robot.

Figure 3:
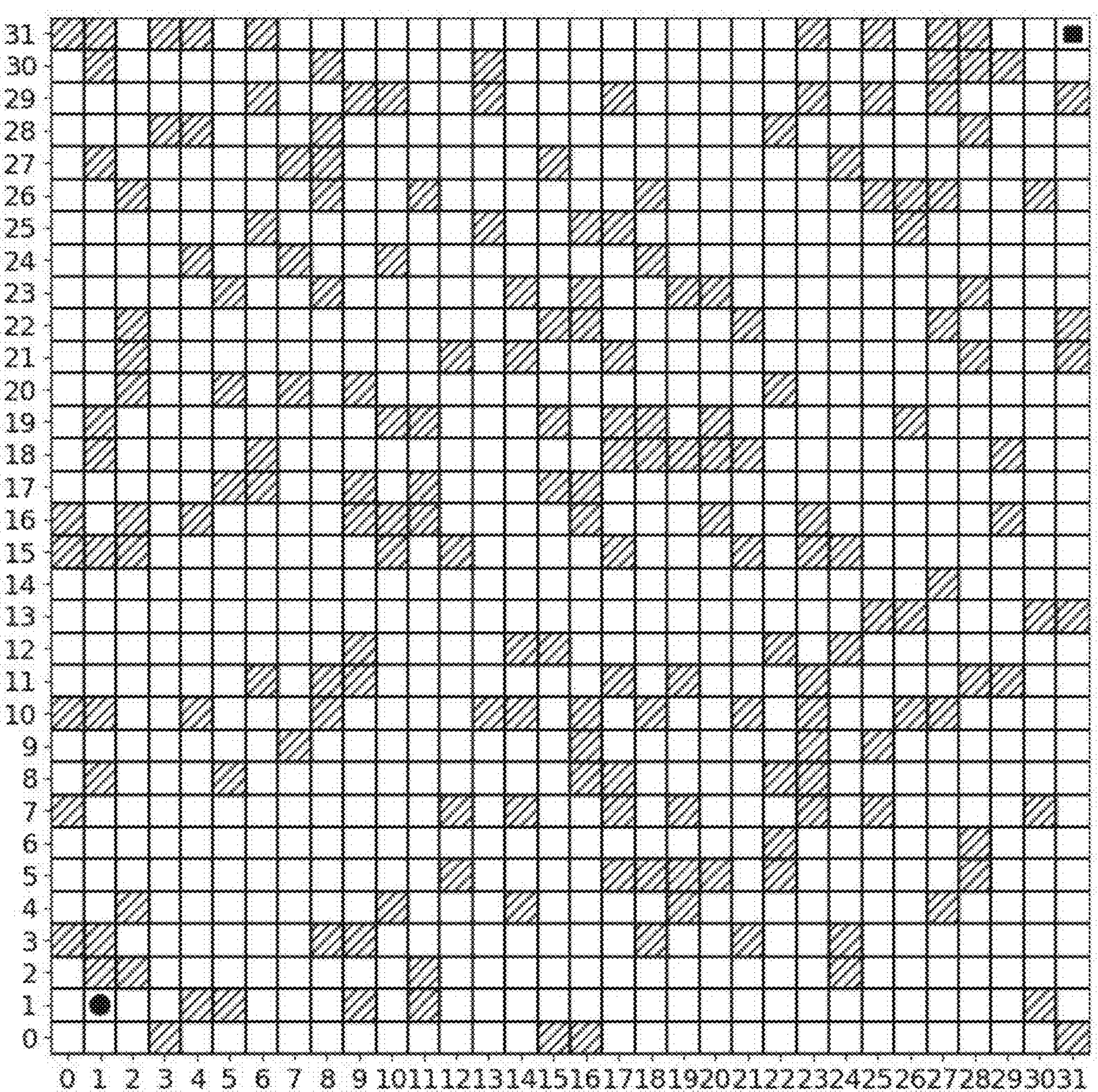
FIG. 3 shows a 32*32 grid map according to an embodiment of the present disclosure.

Step 101 of converting the regional map for path planning into the grid map specifically includes: dividing an actual working environment of the robot into individual unit squares. The real environmental information is transformed into abstract data information, where different grid points can represent various points in the real environment such as passable areas, starting points, target points, and obstacle points. The grid method is chosen for its simplicity in data processing, ease of maintenance, intuitive and rich information representation, and ease of observation. In the working environment within the understanding of the robot, squares are categorized into passable squares and obstacle squares, where the robot can move in the passable squares, and cannot traverse the obstacle squares that indicate the presence of obstacles. During setting of grid colors, black squares in the grid map can be used to depict the working environment of the robot, while white squares can represent the passable areas for the robot, as shown in FIG. 3.

The algorithm selects a node with a minimum ƒ(n) value from the Open set when it is not empty. This node serves as the current point, and the algorithm expands the search from the current point to its four neighbors. The improved algorithm introduces a function to determine the presence of inflection points when expanding nodes, and turning costs are defined on this basis. The algorithm compares the abscissa and y-coordinate values of the current point with the abscissa and y-coordinate values of its parent node. A turn is considered to be valid only when both the comparison result in the previous step and the result of comparison between coordinate values of the current point and the expanded point meet specified conditions. Since the starting point does not have a parent node, a parent node needs to be preset for the starting point to ensure that the program runs smoothly.

Step 102 specifically includes the following sub-steps:

initializing a parent node for the starting point, setting a turning penalty cost, and adding the parent node of the starting point to an Open set, where an initial movement cost is 0;

removing a node with a minimum cost function value from the Open set to a Close set, and using the node with the minimum cost function value as a current node;

expanding four neighboring nodes from the current node;

traversing the neighboring nodes expanded from the current node, and if a currently traversed neighboring node is not in the Close set (if it is in the Close set, skipping this step), determining whether the current node is a turning node based on the current node, a parent node of the current node, and the currently traversed neighboring node;

if the current node is a turning node, recalculating a cost function value from the current node to the currently traversed neighboring node using the cost function that includes the turning costs, where the cost function value ƒ(n) of the current node includes a movement cost g(n) and an estimated cost h(n);

if the movement cost after the recalculation is less than the movement cost before the recalculation, updating the cost function value of the current node to the recalculated cost function value, updating the current node to a parent node of the currently traversed neighboring node, and adding the currently traversed neighboring node to the Open set; otherwise, skipping this step; and repeating the step of "removing a node with a minimum cost function value from the Open set to a Close set, and using the node with the minimum cost function value as a current node", until the neighboring nodes expanded from the current node include the target point, and concluding the improved A* algorithm.

In the present disclosure, if an abscissa of the parent node of the current node is the same as an abscissa of the current node, and the abscissa of the current node is different from an abscissa of the currently traversed neighboring node, the current node is a turning node; if an ordinate of the parent node of the current node is the same as an ordinate of the current node, and the ordinate of the current node is different from an ordinate of the currently traversed neighboring node, the current node is a turning node.

The present disclosure introduces the cost function that includes the turning costs, which is represented as follows:

$$f(n) = g(n) + h(n);$$

$$g(n) = \text{step\_cost}(n) + \text{turn\_cost}(n);$$

ƒ(n) is a cost function value of node n, g(n) is a cost of node n from the starting point (movement cost), h(n) is an estimated cost of node n to an endpoint, step_cost(n) is a linear movement cost of node n, and turn_cost(n) is a turning cost of node n, where if node n is not a turning node, g(n)=step_cost(n).

The pseudocode for the turning cost function is presented in Table 1.

TABLE 1

| Pseudocode for Inflection Point Optimization Method |
| --- |

```
Pseudocode:
turn_cost = a
for neighbor in neighbor_list:
    if neighbor in close_set:
      continue
```

TABLE 1-continued

| Pseudocode for Inflection Point Optimization Method |
| --- |

```
    if current.x == came__from[current].x and neighbor.x != current.x:
        g = current.g + step __ cost + turn __ cost
    if current.y == came__from[current].y and neighbor.y != current.y:
        g = current.g + step __ cost + turn __ cost
    else:
        g = current.g + step __ cost
    if neighbor not in open__set:
        open__set |= {neighbor}
    if g >= neighbor.g:
        continue
    came__from[neighbor] = current
    neighbor.g = g
neighbor.f =neighbor. g + neighbor.h
```

In Table 1, a represents an initial value of the turning cost; neighbor represents a neighboring node; neighbor_list represents a neighboring node set; close_set represents the Close; current.x represents the abscissa of the current node; came_from[current].x represents the abscissa of the parent node of the current node; neighbor.x represents the abscissa of the neighboring node; current.y represents the ordinate of the current node; came_from[current].y represents the ordinate of the parent node of the current node; neighbor.y represents the ordinate of the neighboring node; g represents the updated movement cost; current.g represents the current movement cost; step_cost is step_cost(n) and turn_cost is turn_cost(n); open_set represents the Open set; neighbor.ƒ represents the cost function value of the neighboring node; neighbor.g represents the movement cost of the neighboring node; and neighbor.h represents the estimated cost of the neighboring node.

Figure 7:
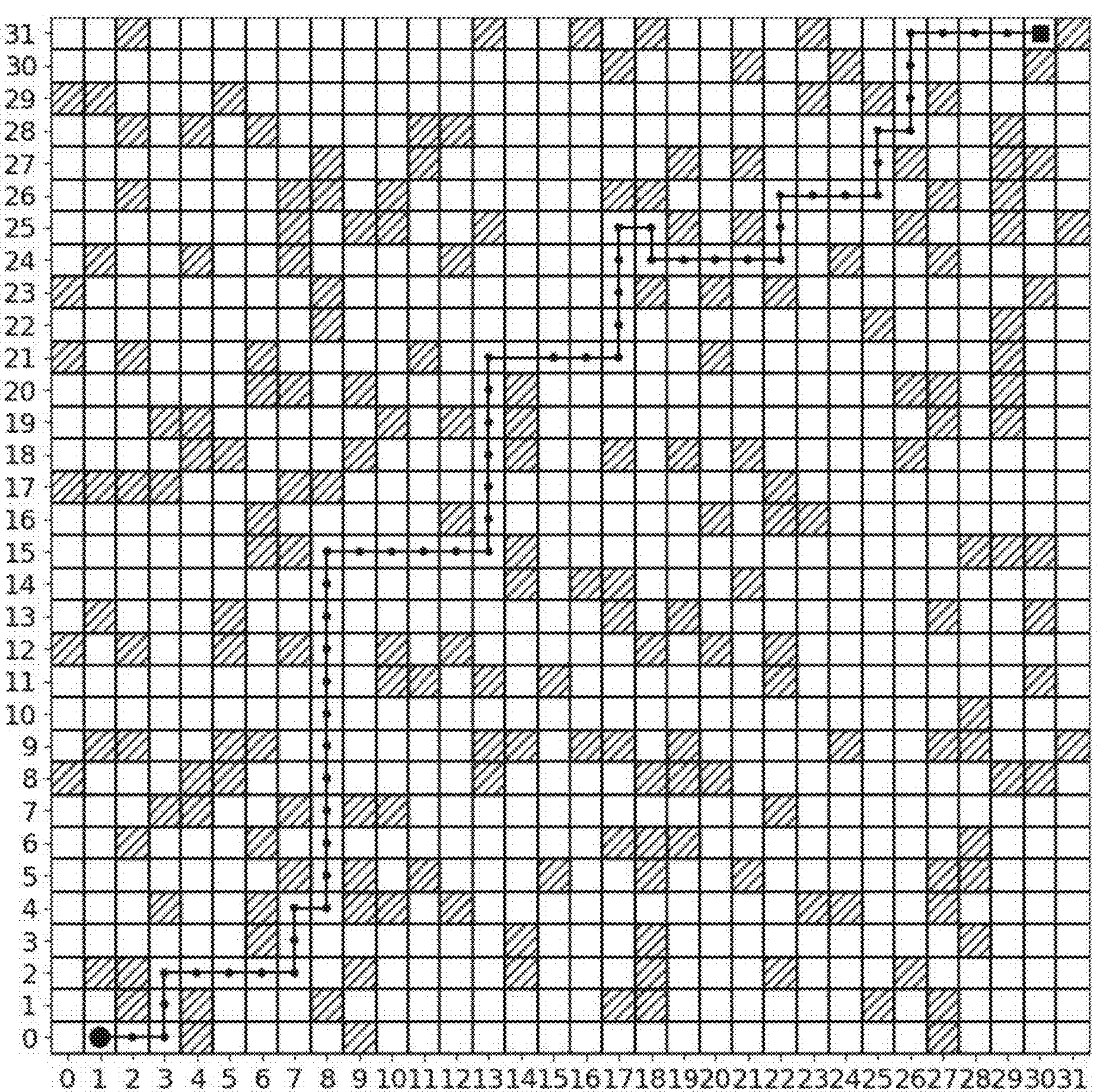
FIG. 7 is a schematic effect diagram of a path generated using an improved A* algorithm with a turning cost turn_cost=0.5 according to an embodiment of the present disclosure.

Multiple simulation verifications were conducted on the improved A* algorithm with the designed turning penalty function. To validate the impact of the set turning penalty cost on the final planned path, simulation experiments with different turning penalty costs were conducted for comparison, and the effects of different turning costs on path inflection points and final lengths were analyzed. FIG. 7 shows the path planning when the turning penalty is set to turn_cost=0.5 on a 32*32 map.

Figure 8:
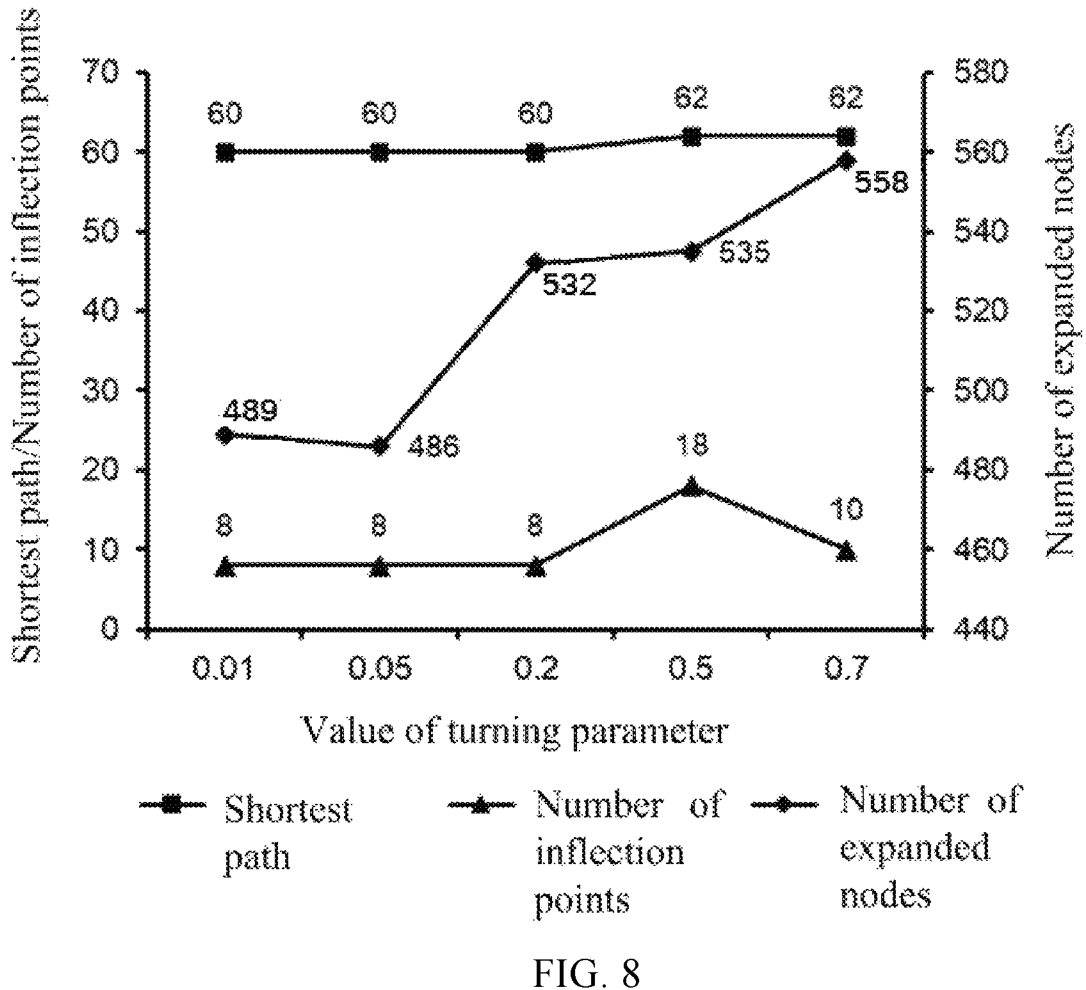
FIG. 8 is a schematic effect diagram of path planning with different turning costs according to an embodiment of present disclosure.

FIG. 8 displays the path planning information on the same map when the turning penalty costs are set to 0.01, 0.05, 0.2, 0.5, and 0.7, respectively. It mainly records the distance of the shortest path, the number of inflection points on the path, and the number of expanded nodes during the search.

After multiple simulation experiments with different turning penalty costs for comparison, the experimental results indicate that when the turning cost turn_cost is set to a small value such as 0.01 or 0.05, the planned path has the least inflection points, similar numbers of expanded nodes, and the shortest length. However, when the turning cost turn_cost is set to a relatively large value such as 0.2, 0.5, or 0.7, the planned path has more expanded nodes and more inflection points, and is not the shortest length. Considering these factors, the turning penalty cost for the following simulation experiments is set to turn_cost=0.01.

Figure 9A:
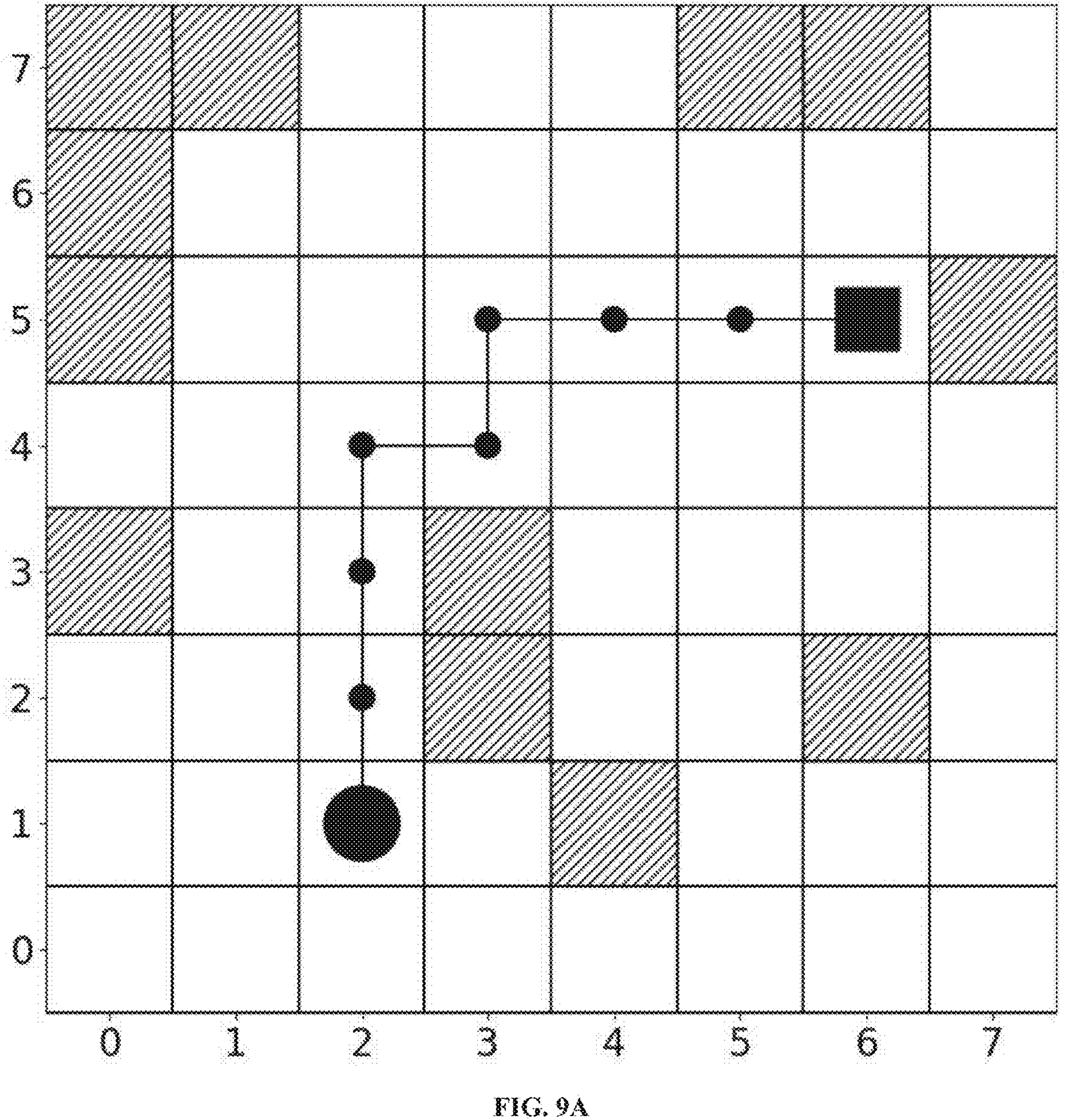
FIGS. 9A-9B are schematic diagrams showing a comparison between paths generated using a traditional A* algorithm and an improved A* algorithm in a small-scale map according to an embodiment of the present disclosure.
Figure 9B:
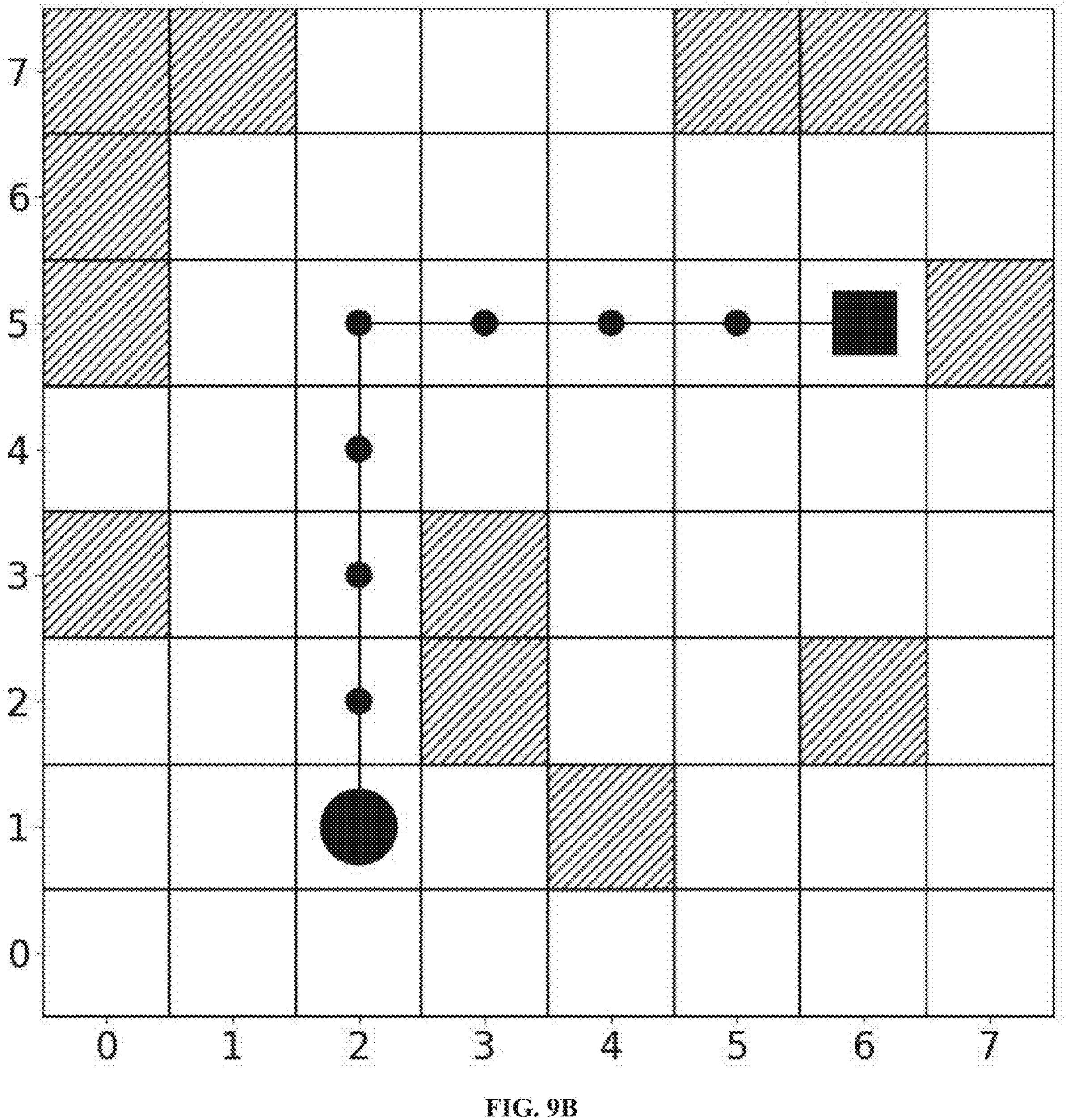

FIGS. 9A-9B illustrate the path planning effects of the original A* algorithm and the improved A* algorithm (in FIG. 9B) in a simple environment. FIG. 9A shows the path planning effect of the original A* algorithm, while FIG. 9B shows the path planning effect of the improved A* algorithm.

The comparison of information on path searching in an 8*8 map before and after the improvement of the A* algorithm is shown in Table 2.

TABLE 2

Comparison of A* Algorithm Before and After Optimization
8*8 small-scale environment map

| Comparison algorithm | Original A* algorithm | Improved A* algorithm |
| --- | --- | --- |
| Shortest path units | 8 | 8 |
| Number of inflection points | 2 | 1 |
| Number of expanded nodes | 26 | 26 |

Figure 10:
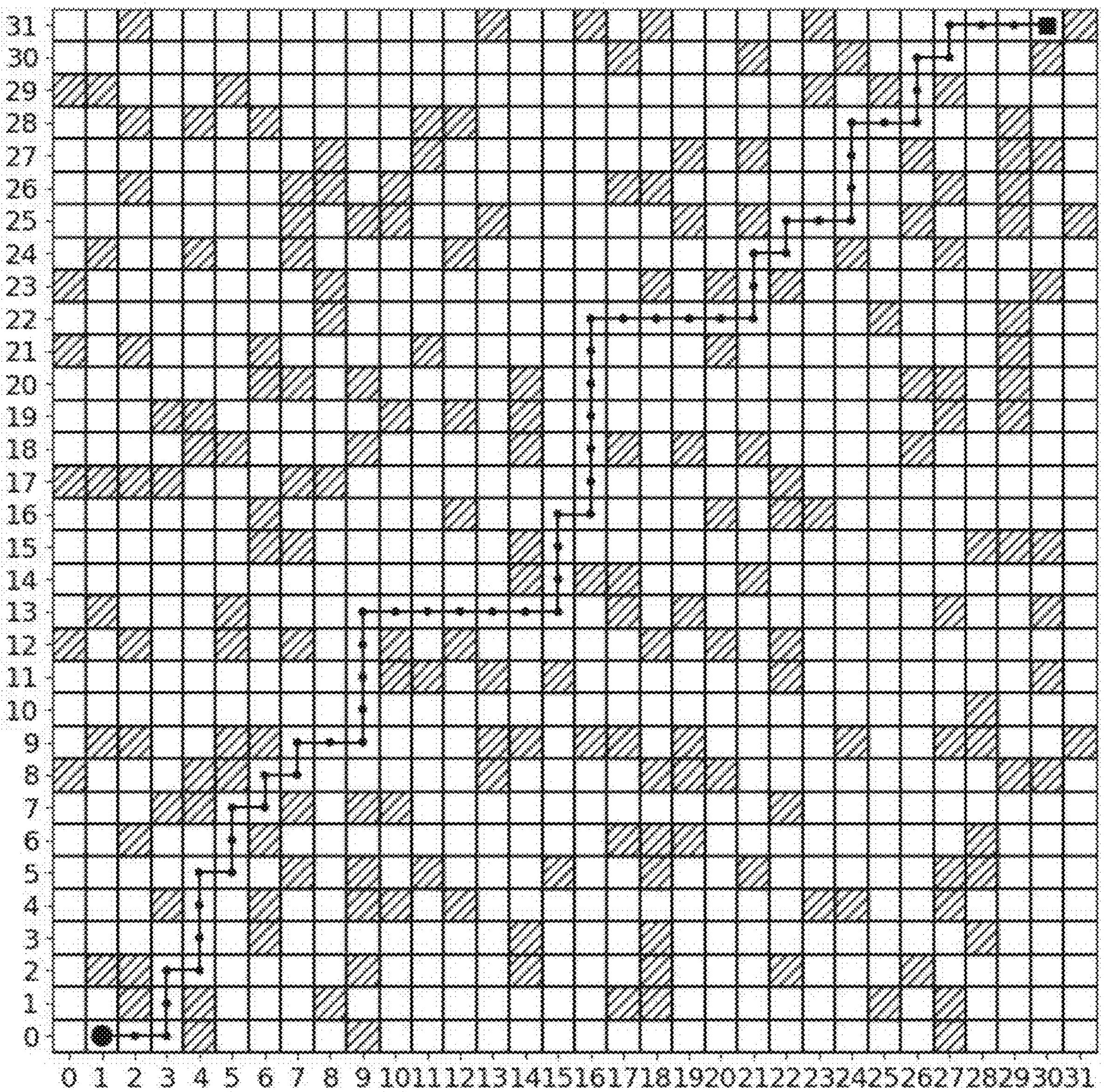
FIG. 10 is a second schematic diagram of a path generated using a traditional A* algorithm according to an embodiment of the present disclosure.
Figure 11:
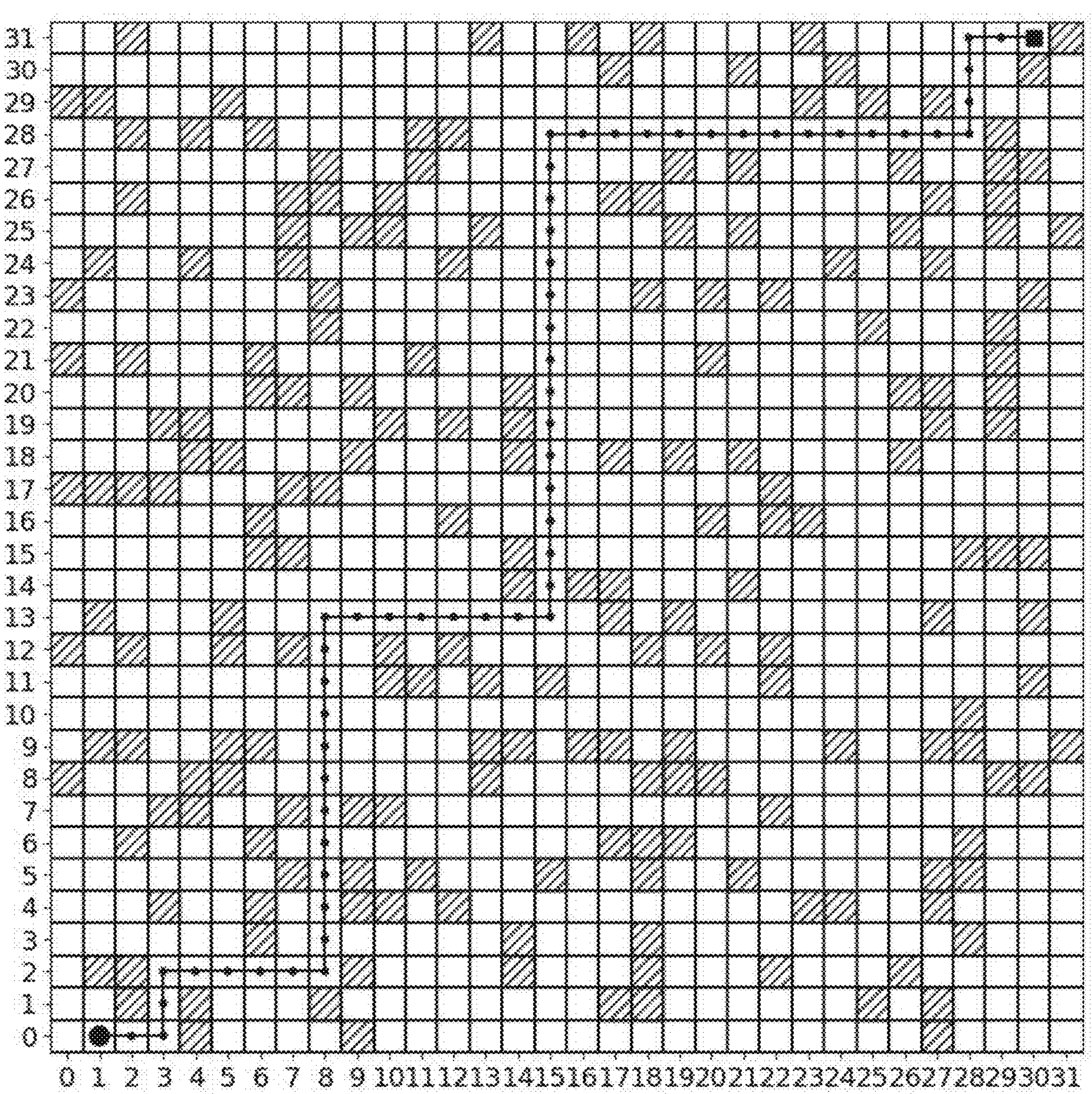
FIG. 11 is a schematic diagram of a path generated using an improved A* algorithm according to an embodiment of the present disclosure.

FIG. 10 presents the path planning effect of the traditional A* algorithm on a 32*32 complex environment map, while FIG. 11 shows the path planning effect of the improved A* algorithm on the 32*32 complex environment map.

The comparison of information on path searching in a 32*32 map before and after the improvement of the A* algorithm is shown in Table 3.

TABLE 3

A* Algorithm Comparison Before and After Optimization
Comparison of algorithm performance on 32*32 random environment maps before and after improvement

| Comparison items | Before improvement Map 1 | After improvement Map 1 | Before improvement Map 2 | After improvement Map 2 | Before improvement Map 3 | After improvement Map 3 |
| --- | --- | --- | --- | --- | --- | --- |
| Shortest path units | 60 | 60 | 57 | 57 | 56 | 56 |
| Number of inflection points | 26 | 8 | 20 | 7 | 31 | 6 |
| Expanded nodes | 466 | 486 | 354 | 464 | 319 | 406 |

Figure 12:
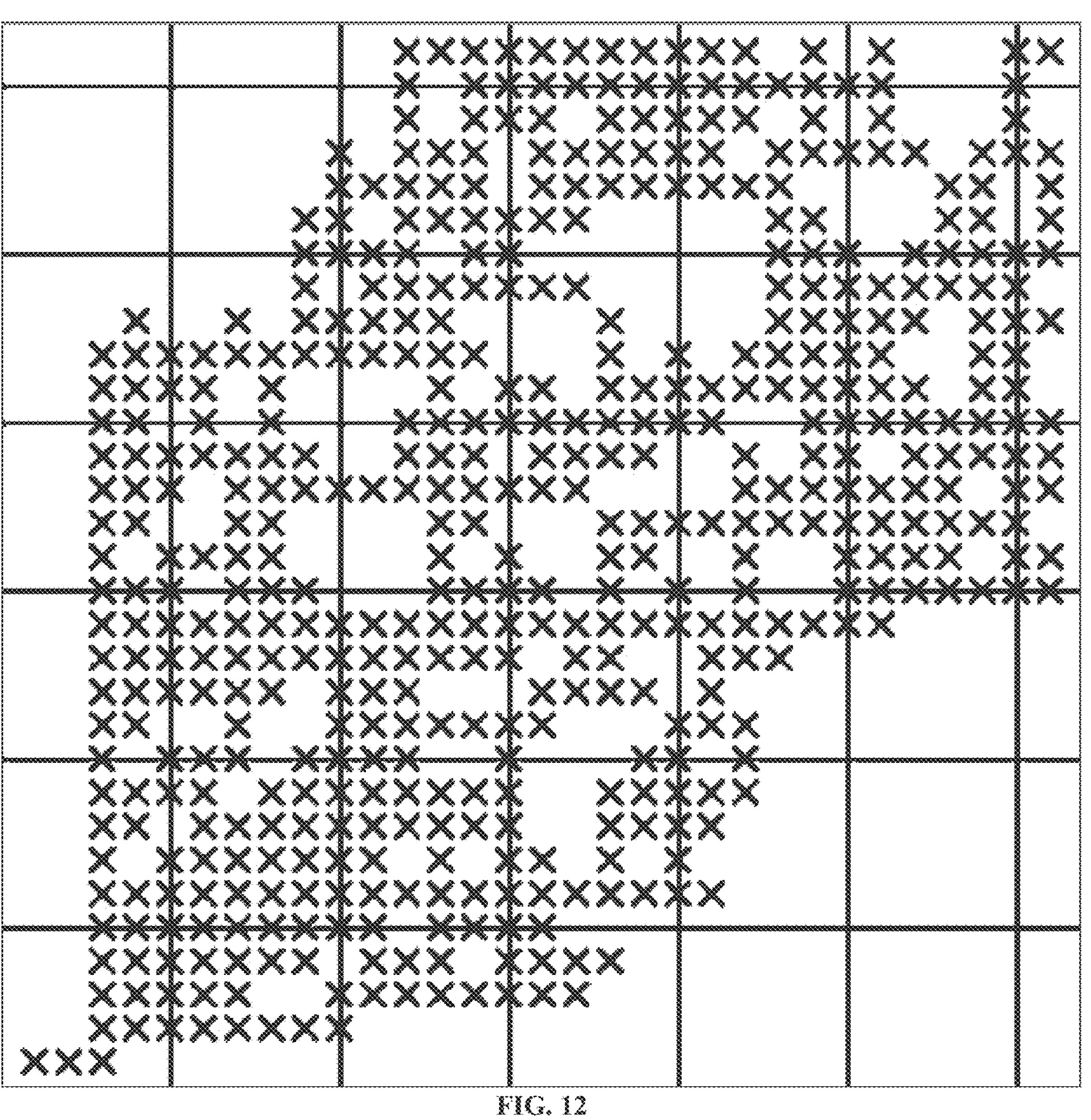
FIG. 12 is a schematic diagram showing expanded nodes in path planning using an A* algorithm under a 32*32 grid size according to an embodiment of the present disclosure.

For the optimization of search speed: During the simulation process, printing location information of the current node revealed that the algorithm expanded too many unnecessary nodes during searching, leading to lower search efficiency with more expanded nodes. FIG. 12 shows the expanded node graph of a scenario under a 32*32 grid size.

Three sets of random maps were selected from the simulation experiments for comparison experiments. By analyzing three sets of experiment results, it was concluded that the optimized A* algorithm with the turning penalty function significantly reduces the number of inflection points in the planned path compared to the traditional A* algorithm, and the shortest path lengths in the optimized A* algorithm and the traditional A* algorithm are equal; the improved A* algorithm with the turning penalty function expands more search nodes.

Figure 13:
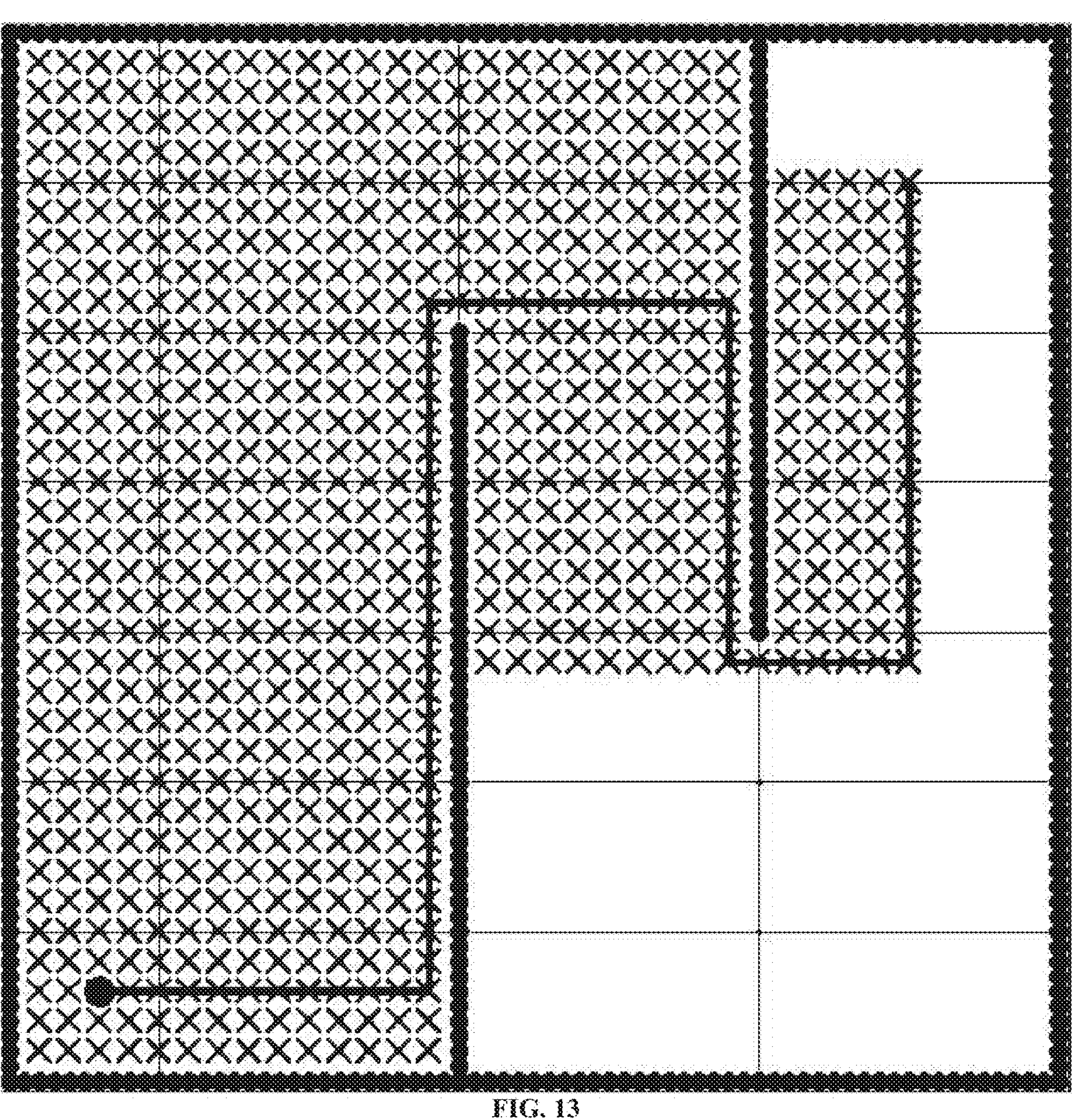
FIG. 13 is a schematic diagram showing expanded nodes under a 50*50 grid size according to an embodiment of the present disclosure, where a heuristic function is not optimized.
Figure 14:
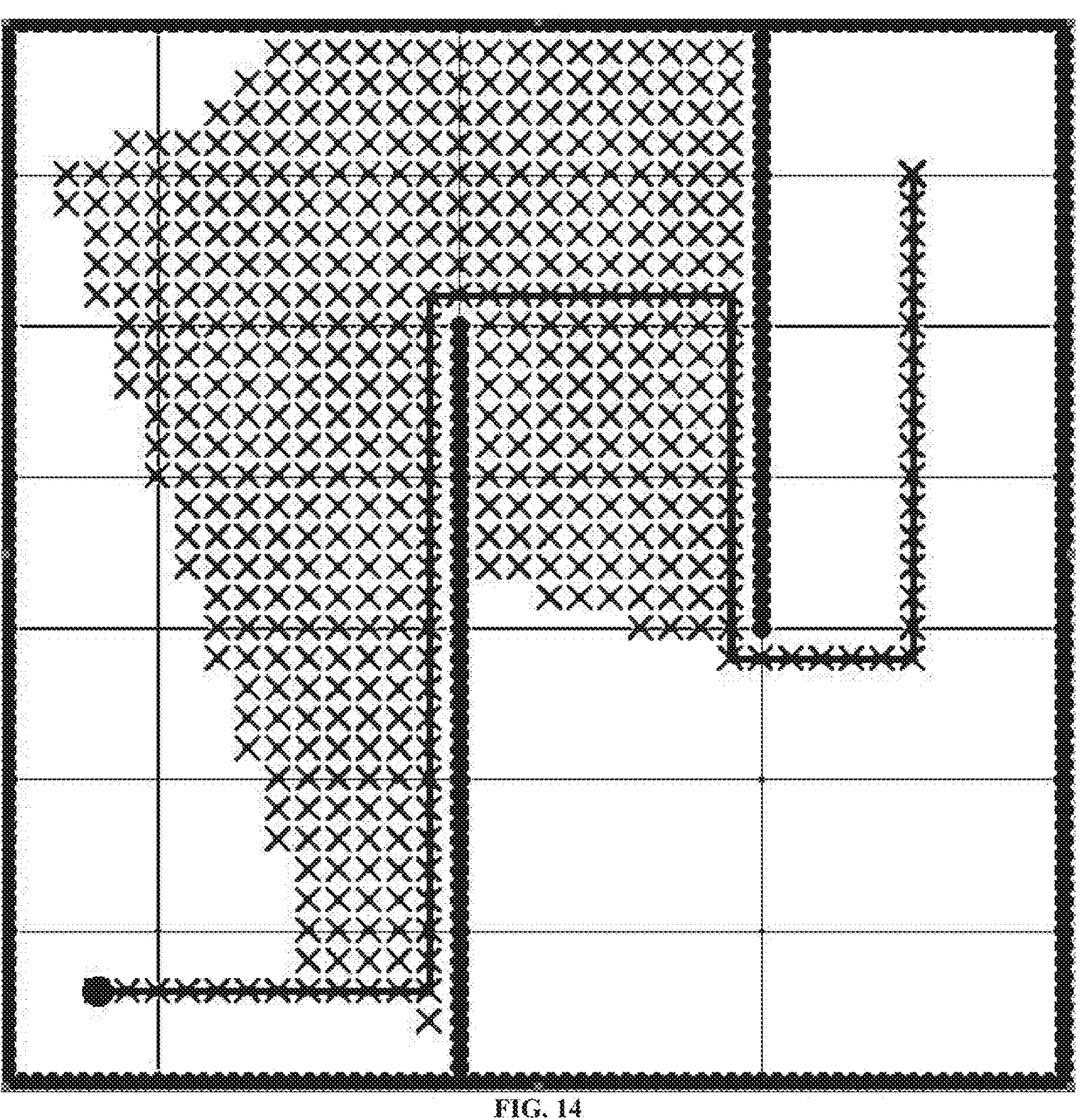
FIG. 14 is a schematic diagram showing expanded nodes under a 50*50 grid size according to an embodiment of the present disclosure, where a heuristic function weight is set to 2.
Figure 15:
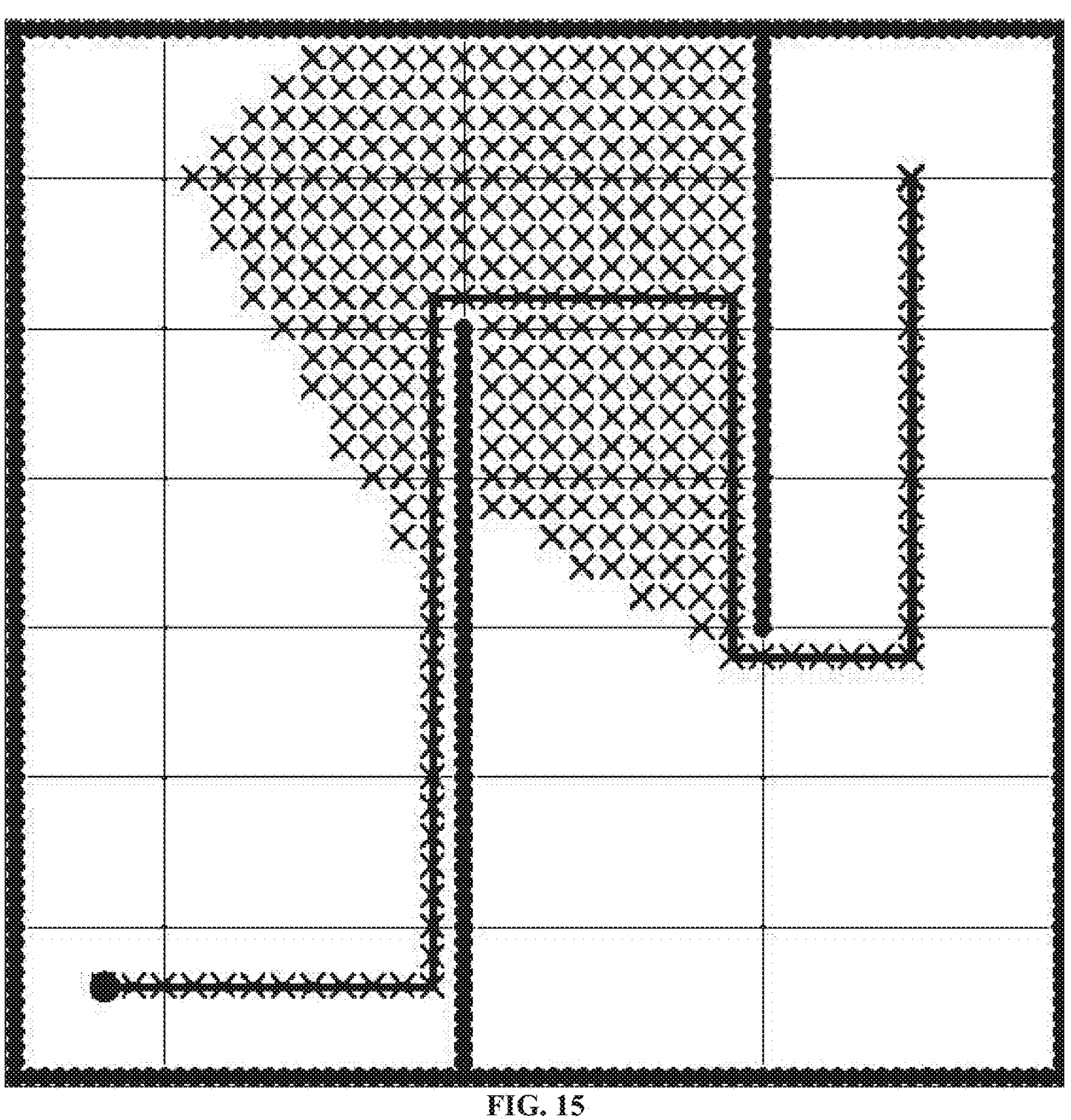
FIG. 15 is a schematic diagram showing expanded nodes under a 50*50 grid size according to an embodiment of the present disclosure, where a heuristic function weight is set to 4.

The optimization of the present disclosure primarily focuses on optimizing the heuristic function. In the simulation experiments, a weight value was designed for the heuristic function to increase its influence. FIG. 13 to FIG. 15 demonstrate the different performances of heuristic functions with varying weight values in path planning, where the cross symbol represents the expanded nodes.

Figure 16:
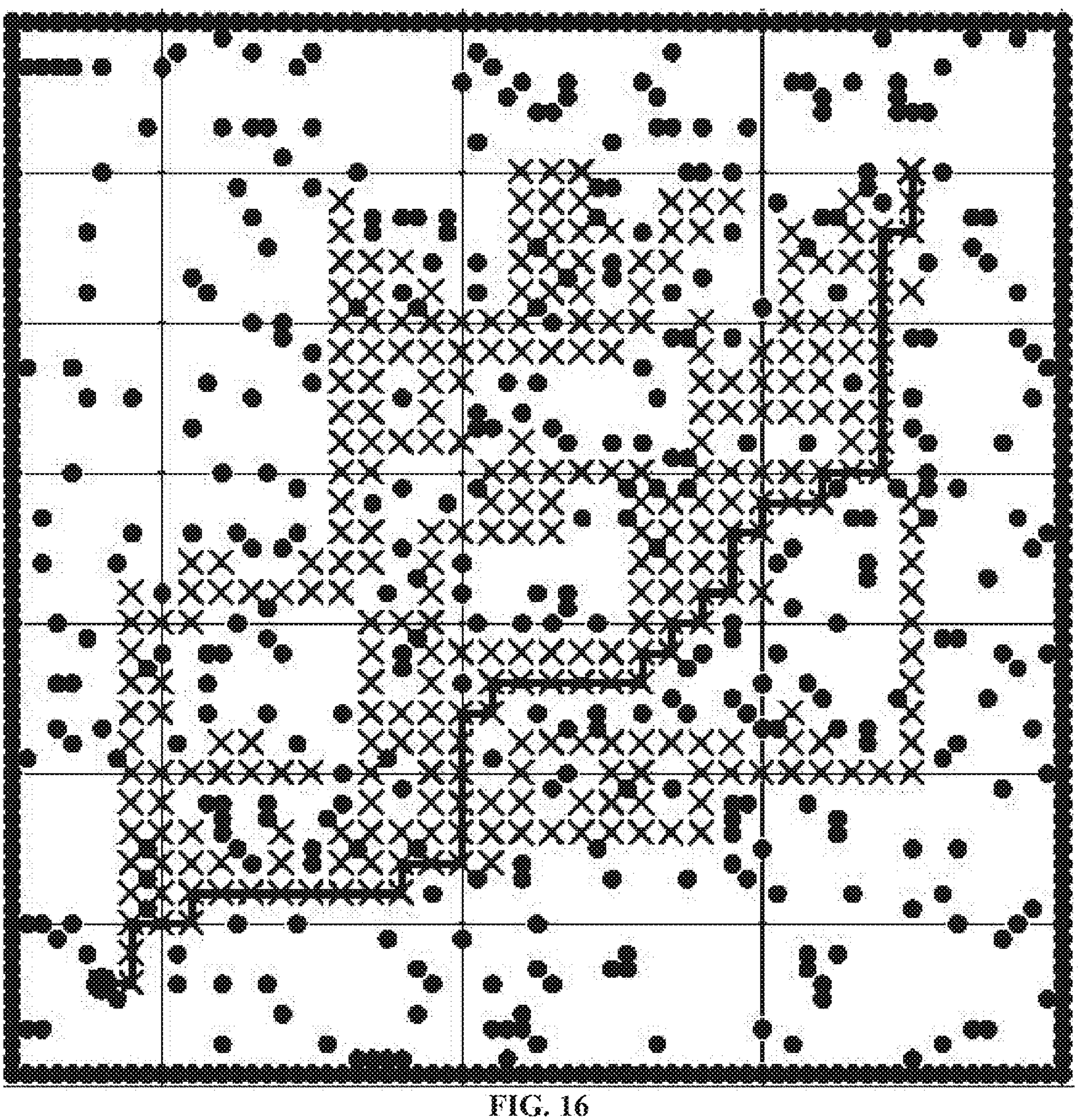
FIG. 16 is a schematic diagram of a randomly generated map according to an embodiment of the present disclosure, with a weight set to 1.
Figure 17:
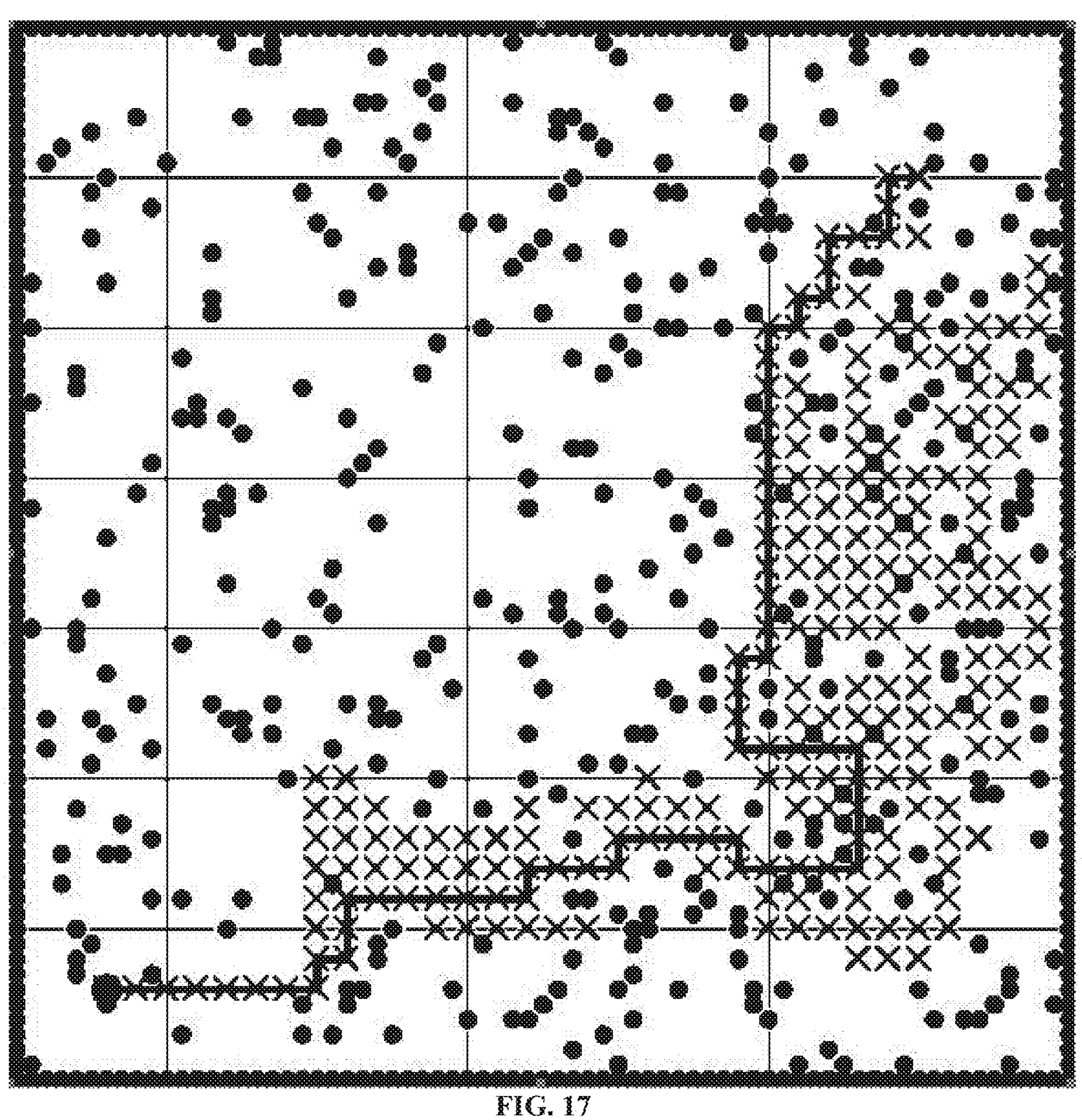
FIG. 17 is a schematic diagram of a randomly generated map according to an embodiment of the present disclosure, with a weight set to 1.5.
Figure 18:
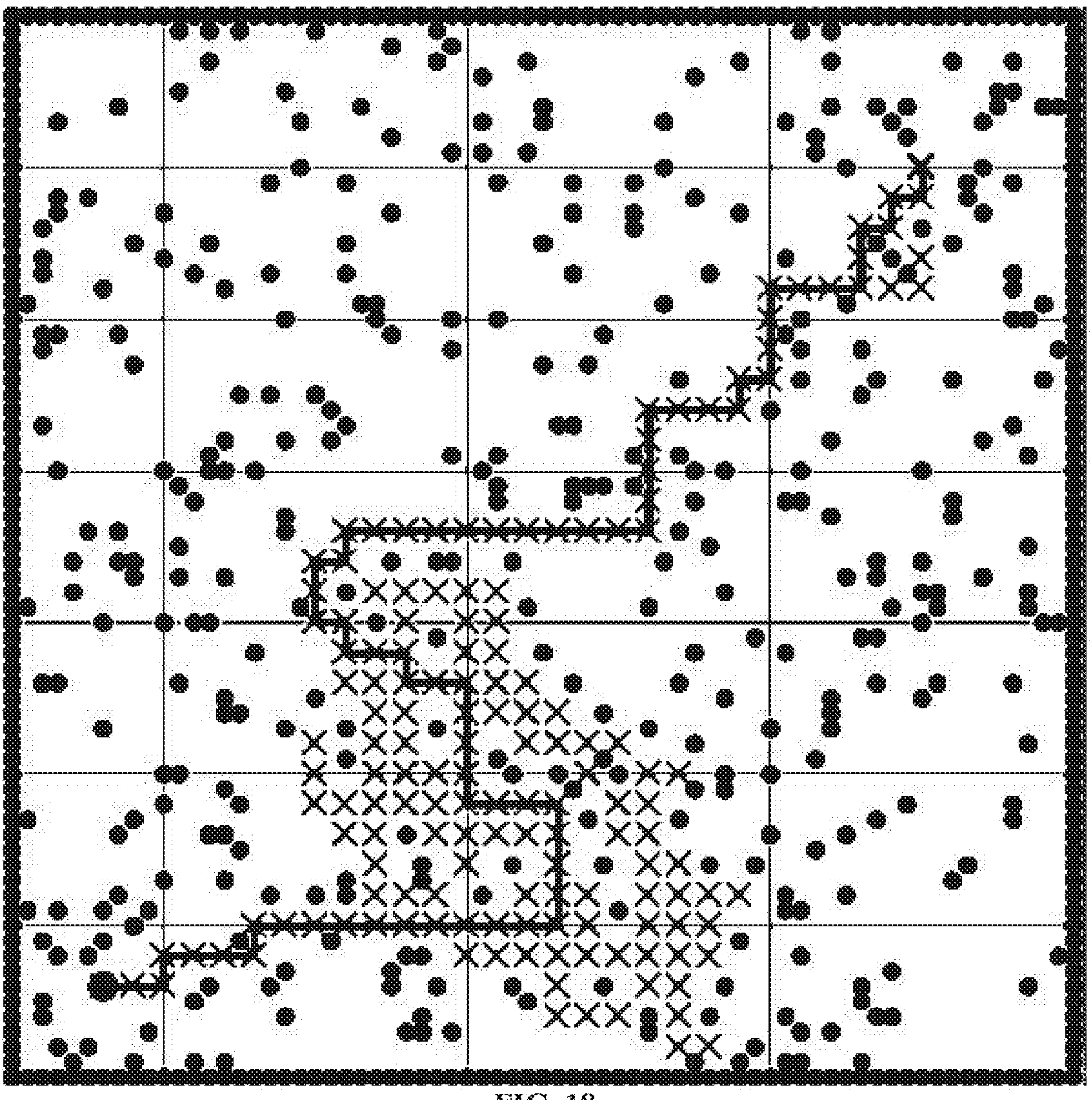
FIG. 18 is a schematic diagram of a randomly generated map according to an embodiment of the present disclosure, with a weight set to 3.

Through the comparison in FIG. 13 to FIG. 15, it was observed that in a simple environment, the number of expanded nodes decreases as the weight of the heuristic function increases. A significant weight percentage of the heuristic function is required to cause a change in the number of expanded nodes. Through the comparison in FIG. 16 to FIG. 18, it was observed that in a complex environment, a small weight coefficient for the heuristic function may lead to fewer expanded search nodes. Additionally, when the weight of the heuristic function is set too high, extra expanded nodes and path deterioration may occur during the search. Based on these observations and multiple simulation experiments, a dynamic weighting method for the heuristic function was designed to address the issue of generating excessive nodes during the search and low search efficiency. The adoption of a dynamically weighted search algorithm in the early stage can accelerate the search speed in the early stage, while the weighted strategy adopted in the later stage aims to find a better path without missing the optimal current node.

The cost function in the improved A* algorithm is further represented as follows:

$$f(n)=g(n)+w*h(n).$$

f(n) is a movement cost of node n, g(n) is a cost of node n from the starting point, h(n) is an estimated cost of node n to the endpoint, and w is a dynamic parameter. The main strategy for dynamic parameter changes is the distance from the target point. After multiple experiments, a straight-line distance d is finally selected as the trigger for the dynamic parameter d. w is set to 1.2 and 0.95.

$$d=\text{math}\cdot hypot(n1.x-n2.x,\ n1\cdot y-n2\cdot y).$$

The math.hypot function, provided by the math module in Python, is a method for calculating the hypotenuse of a right-angled triangle given the lengths of the two perpendicular sides. It is equivalent to using a Euclidean distance formula. n1.x represents the abscissa value of node n1, n2.x represents the abscissa value of node n2, n1.y represents the ordinate value of node n1, and n2.y represents the ordinate value of node n2.

If a distance between node n and the target point is greater than a set distance, w=1.5; otherwise, w=0.95.

The dynamic weighting method is applied to the A* algorithm to conduct path planning experiments in randomly generated obstacle environments. The comparison with the traditional A* algorithm in terms of the number of traversed nodes and the path length is shown in Table 4.

TABLE 4

Traversed Node Data of Improved A* Algorithm in Random Maps

| Experiment | Algorithm | Number of traversed nodes | Path length |
|---|---|---|---|
| Experiment 1 | Traditional A* | 321 | 58 |
| | Improved A* | 128 | 60 |
| Embodiment 2 | Traditional A* | 390 | 55 |
| | Improved A* | 165 | 55 |
| Embodiment 3 | Traditional A* | 346 | 57 |
| | Improved A * | 135 | 57 |
| Embodiment 4 | Traditional A* | 381 | 55 |
| | Improved A * | 142 | 55 |

From Table 4, it can be observed that the improved algorithm significantly reduces the number of expanded nodes during search in a 70*70 grid map, while also maintains the optimality of the solution in later searches. The path distance obtained based on the improved algorithm is almost equivalent to the optimal path distance, with only a few cases where it exceeds the optimal path distance. Overall, the search efficiency of the improved algorithm compared to the traditional A* algorithm has been significantly enhanced.

The present disclosure primarily addresses the issue of excessive turning points in the paths planned by the traditional A* algorithm in maps of different scales, as well as the inefficiency caused by expanding too many useless nodes during the search process, and thus designs two methods, i.e., the turn penalty function and dynamic weighting. Simulation experiment results indicate that the improved A* algorithm has fewer turning points in the planned path and higher search efficiency.

Each embodiment in the description is described in a progressive mode, each embodiment focuses on differences from other embodiments, and references can be made to each other for the same and similar parts between embodiments.

Specific examples are used herein for illustration of the principles and embodiments of the present disclosure. The description of the foregoing embodiments is used to help understand the method of the present disclosure and the core principles thereof. In addition, those of ordinary skill in the art can make various modifications in terms of specific embodiments and scope of application in accordance with the teachings of the present disclosure. In conclusion, the content of the description shall not be construed as limitations to the present disclosure.

What is claimed is:

1. A vehicle navigation method based on an A-star (A*) algorithm, comprising:

converting a regional map for path planning into a grid map;

planning a target travel path of an automated guided vehicle (AGV) from a starting point to a target point on the grid map by amending a cost function in the A* algorithm;

wherein the amended cost function in the A* algorithm is represented as follows:

$$f(n)=g(n)+w*h(n);$$

$f(n)$ is a cost function value of node n, g(n) is a movement cost of node n, h(n) is an estimated cost of node n to an endpoint, and w is a dynamic parameter; and if a distance between node n and the target point is greater than a set distance, w=1.5: otherwise, w=0.95; and navigating the AGV along the target travel path.

2. The vehicle navigation method based on an A* algorithm according to claim 1, wherein said planning the target travel path of the AGV from the starting point to the target point on the grid map by using the A* algorithm specifically comprises:

initializing a parent node for the starting point and adding the parent node of the starting point to an Open set;

removing a node with a minimum cost function value from the Open set to a Close set, and using the node with the minimum cost function value as a current node;

expanding neighboring nodes for the current node;

traversing the neighboring nodes expanded from the current node, and if a currently traversed neighboring node is not in the Close set, determining whether the current node is a turning node based on the current node, a parent node of the current node, and the currently traversed neighboring node;

if the current node is a turning node, recalculating a cost function value from the current node to the currently traversed neighboring node using the cost function that comprises the turning costs, wherein the recalculated cost function value comprises a movement cost and an estimated cost;

if the movement cost after the recalculation is less than the movement cost before the recalculation, updating the cost function value of the current node to the recalculated cost function value, updating the current node to a parent node of the currently traversed neighboring node, and adding the currently traversed neighboring node to the Open set; and repeating the step of "removing a node with a minimum cost function value from the Open set to a Close set, and using the node with the minimum cost function value as a current node", until the neighboring nodes expanded from the current node comprise the target point, and concluding the A* algorithm.

3. The vehicle navigation method based on an A* algorithm according to claim 1, wherein the cost function further comprises:

$$g(n) = \text{step\_cost}(n) + \text{turn\_cost}(n)$$

wherein step_cost(n) is a linear movement cost of node n, and turn_cost(n) is a turning cost of node n.

4. The vehicle navigation method based on an A* algorithm according to claim 2, wherein said determining whether the current node is a turning node based on the current node, the parent node of the current node, and the currently traversed neighboring node comprises:

if an abscissa of the parent node of the current node is the same as an abscissa of the current node, and the abscissa of the current node is different from an abscissa of the currently traversed neighboring node, determining that the current node is a turning node; and if an ordinate of the parent node of the current node is the same as an ordinate of the current node, and the ordinate of the current node is different from an ordinate of the currently traversed neighboring node, determining that the current node is a turning node.

5. The vehicle navigation method based on an A* algorithm according to claim 3, wherein the turning cost of node n is set to 0.01.

* * * * *